Figure 1:
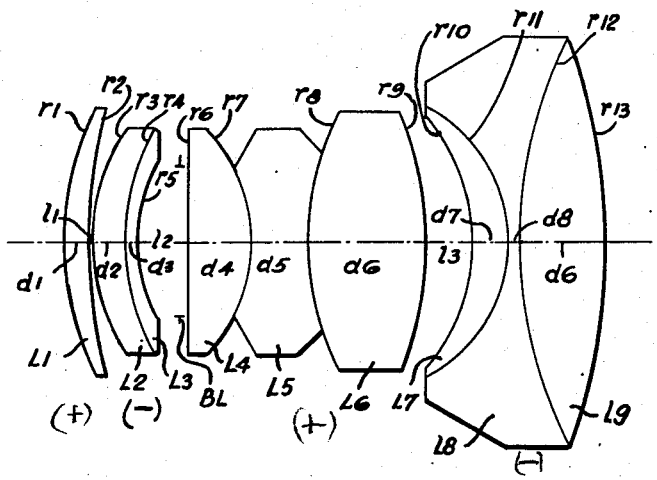

April 17, 1951 L. BERTELE 2,549,159
HIGHLY CORRECTED PHOTOGRAPHIC OBJECTIVE HAVING
FOUR AXIALLY AIR SPACED COMPONENTS
Filed July 16, 1948 2 Sheets-Sheet 1

INVENTOR.
Ludwig Bertele
BY
ATTORNEYS

April 17, 1951         L. BERTELE       2,549,159
HIGHLY CORRECTED PHOTOGRAPHIC OBJECTIVE HAVING
FOUR AXIALLY AIR SPACED COMPONENTS
Filed July 16, 1948                        2 Sheets-Sheet 2

INVENTOR.
Ludwig Bertele
BY
ATTORNEYS

Patented Apr. 17, 1951

2,549,159

UNITED STATES PATENT OFFICE 2,549,159

HIGHLY CORRECTED PHOTOGRAPHIC OBJECTIVE HAVING FOUR AXIALLY AIR SPACED COMPONENTS

Ludwig Bertele, Heerbrugg, Switzerland, assignor to Henry Wild Surveying Instruments Supply Co. Ltd., Heerbrugg, Switzerland, a Swiss company Application July 16, 1948, Serial No. 39,000
In Switzerland August 23, 1947

4 Claims. (Cl. 88—57)

This invention relates to objectives of the type having at least four components in air. An object of the present invention is the provision of an improved objective which is particularly suitable for measuring purposes and which provides images with perfectly sharp outlines. In accordance with the present invention, of the four components the first and third are convergent, the fourth is a dispersing one, and the second component is a meniscus convex towards the object.

The number of the components standing in air can be regarded as greater if cementing of those pairs of surfaces on which no total reflection occurs, is omitted. In this case, the surfaces directed towards each other are separated by air spaces and those surfaces so directed towards each other may then be of different curvature. In the event also of further subdivision by the introduction of a thin layer of air in one of the four components, the number of the free-standing components can be regarded as increased according to the method of observation. Thus each component can consist of a plurality of lenses in air.

The first component of the objective will in general be an uncemented convergent lens. The second component consists of a positive and a negative lens in which the cemented surfaces can be convex or concave. In accordance with the present invention, the third component contains a cemented surface convex towards the image, the index of refraction of the lens in front of this cemented surface being smaller than that of the lens behind this surface. The third component also contains a surface convex towards the object in which the index of refraction of the lens in front of this surface is again smaller than that of the lens following the said surface. In the example hereinafter referred to, the first cemented surface of the third component is convex towards the image and the second cemented surface is convex towards the object. It will be understood, however, that the sequence can also be reversed. The axial thickness of the third component is greater than 0.1f and smaller than 0.5f, wherein f is the total focal length of the objective.

The objective according to the present invention is further characterised by the provision in the fourth component of means which reduce the distortion for all angular inclinations up to about ±30°, to a few tenths per thousand, a diverging effect being exercised upon the center rays.

To this end, there is in the fourth component a cemented surface convex towards the object, the index of refraction in front of this surface being greater than behind the surface (Examples 1–5). The angle of refraction of a ray passing through the centre point of a diaphragm is always at a maximum at this surface as compared with the angles of refraction at the other surfaces. The center rays are diverted outwardly to an extent which is proportional to their angle with the optical axis.

Another method consists in inserting in the fourth component a thinner air lens having the form of a plano-convex lens or a convergent meniscus curved towards the object or image. In view of the larger diameter of the fourth component, the curvatures of the air lens are not large. Preferably the index of refraction of the glass lens located in front of the air lens is smaller than the index of refraction of the glass lens following the air lens. At these two surfaces also the angle of refraction of the ray passing through the centre point of a diaphragm is at a maximum as compared with the angle of refraction at the other cemented surfaces of the objective. Example 6 shows an objective where an air lens in the form of a convergent lens has been introduced into the fourth component.

By one of these two measures the objective is largely free from distortion and thereby acquires valuable properties for surveying purposes without having to forego other advantages of the type.

All the surfaces cemented in the examples herein referred to, can also remain uncemented, be separated from each other by air spaces and present different curvatures as has taken place in Example 3 with the cemented surface in the second component.

Even when there is introduced into one or other of the components an air space not greatly influencing the total effect of the objective as, for example, in the third component of Example 4, this subdivided component is to be regarded, in the sense of the description, as a single member or component.

The number of the lenses forming the individual components can be increased or decreased according to the greater or lesser degree of correction required in the image errors. Such a case is shown in Example 5.

In the accompanying drawings and in the following tables, Figures 1 to 6 illustrate diagrammatically six objectives according to the invention which are given by way of example. The data included in the tables refers to a focal length of 100 mm. All six objectives are computed for an image field of 60°. In each of the figures of the drawings a separate objective is illustrated, the position of the iris diaphragm being indicated by BI; the lenses are indicated by the letter L, radii by $r$, thicknesses by $d$ and air gaps by $l$; types of glass are designated by $n_D$ and Abbe's index $v$.

Figure 1 of the drawings and the tables of Example 1, refer to an objective having four components comprising nine single lenses. The first component is a simple lens ($L_1$), the second component a double lens ($L_2$ and $L_3$) with a cemented surface convex towards the object, the third component is a triple lens ($L_4$, $L_5$, $L_6$) and the fourth component is also a triple lens ($L_7$, $L_8$, $L_9$).

Figure 2:
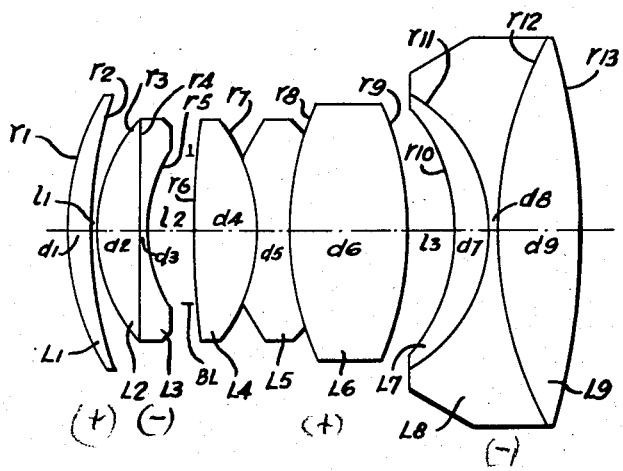

Figure 2 of the drawings and the tables of Example 2 refer to an objective having four components comprising nine single lenses. The first component is a simple lens ($L_1$), the second component a double lens ($L_2$ and $L_3$) having a cemented surface which is convex towards the image, the third component is a triple lens ($L_4$, $L_5$, $L_6$) and the fourth component is also a triple lens ($L_7$, $L_8$, $L_9$).

Figure 3:
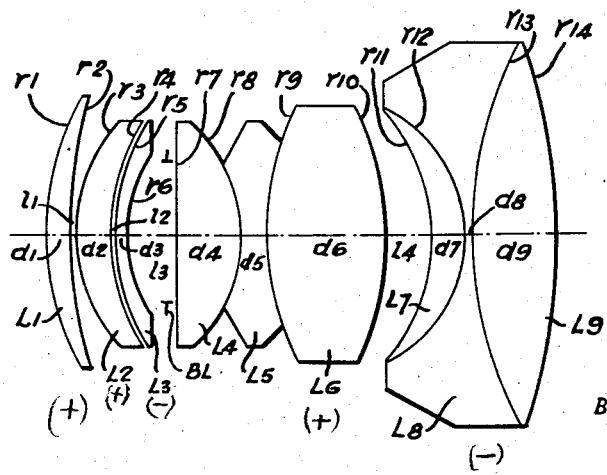

Figure 3 of the drawings and the tables of Example 3 refer to an objective in which the second and third lenses of the second component are not cemented (the objective could consequently also be regarded as consisting of five components). The first component is a simple lens ($L_1$), the second component is a meniscus ($L_2$ and $L_3$), convex towards the object, the third component is a triple lens ($L_4$, $L_5$, $L_6$) as also is the fourth component ($L_7$, $L_8$, $L_9$). If no total reflection is to be feared, the process of decementing can take place in a similar way with the other cemented surfaces.

Figure 4:
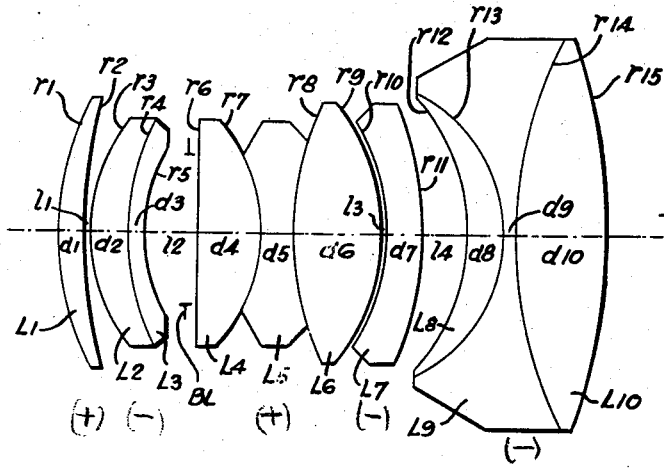

Figure 4 and the tables of Example 4 refer to an objective in which a thin layer of air has been introduced in the third component (here also the objective could be regarded as consisting of five components). The first component is a simple lens ($L_1$), the second component is a meniscus ($L_2$ and $L_3$), consisting of two lenses convex towards the object. The third component ($L_4$, $L_5$, $L_6$, $L_7$) contains one cemented surface curved towards the image, another cemented surface convex towards the object and, in addition, a thin layer of air. The fourth component is a triple lens consisting of $L_8$, $L_9$, and $L_{10}$. It will be understood that in any of the components layers of air may be introduced, as in the third component.

Figure 5:
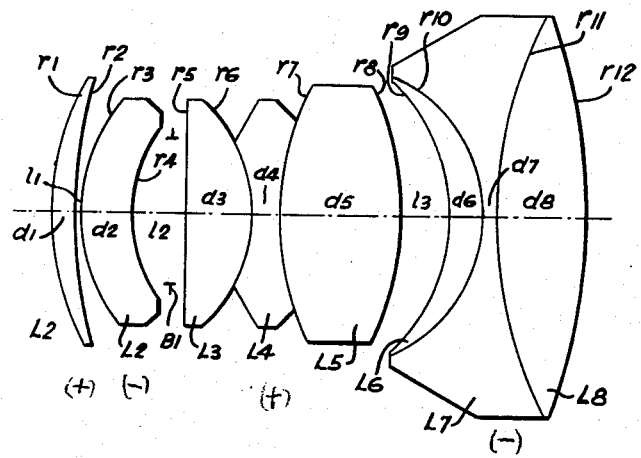

In Figure 5 and the tables of Example 5 an arrangement is shown where, in consequence of a coarser correction of image errors, a cemented surface has been dispensed with. The first and second components are simple lenses ($L_1$ and $L_2$) convex towards the object, the third component is a triple lens ($L_3$, $L_4$ and $L_5$), as also is the fourth component ($L_6$, $L_7$ and $L_8$). With the exception of the cemented surface convex towards the object existing in the fourth component, other cemented surfaces can also be dispensed with in the case of further coarsening of the correction of image faults.

Figure 6:
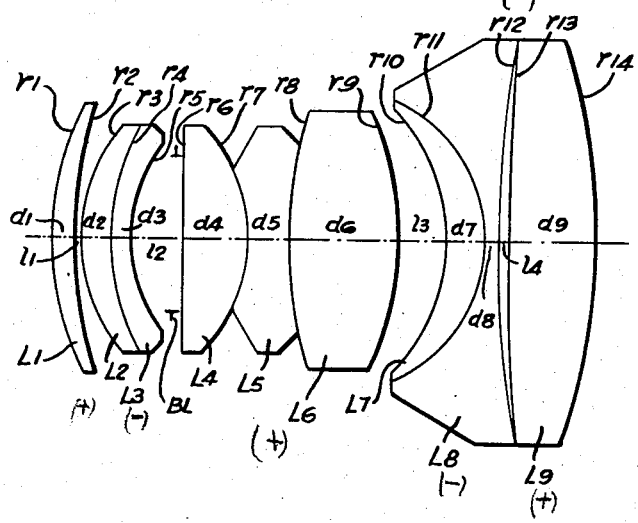

Figure 6 and the tables of Example 6 shows an objective wherein the fourth component instead of having the cemented surface influencing the result, there is introduced an air lens, forming a convergent lens and having the same effect as the cemented surface. The shape of the air lens here corresponds, for example, to a convergent meniscus convex towards the object. The first component is a simple lens ($L_1$), the second component is a meniscus consisting of two lenses ($L_2$ and $L_3$) and convex towards the object, the third component is a triple lens ($L_4$, $L_5$, $L_6$) and the fourth component consists of three lenses ($L_7$, $L_8$, $L_9$), $L_7$ and $L_8$ being in front of the air lens and $L_9$ being arranged after the air lens.

It is apparent that in all constructions the individual lenses are separated by air gaps; the air gap between the first lens and the second lens has the form of dispersing lens with its surface of greater curvature directed toward the second lens; the space between the second lens and the third lens has the form of convergent lens with its surface of greater curvature directed toward the second lens; the space between the third and the forth lens has the form of a convergent meniscus curved toward the image and having its surface of greater curvature directed toward the fourth lens.

In all constructions, the center rays passing through the fourth component form the greatest angle of incidence at the surfaces of the cemented or uncemented pair of lenses, said angle consisting of the angle formed by the ray and a perpendicular to the surface.

Example 1

[Aperture ratio 1 : 4.15]

| | Radii | Thicknesses and separations | Kinds of glass | |
|---|---|---|---|---|
| | | | $n_D$ | $v$ |
| $L_1$ | $r_1 = +\ 37.17$ | $d_1 = 3.21$ | 1.6420 | 58.0 |
| | $r_2 = +\ 67.91$ | $l_1 = 0.09$ | | |
| $L_2$ | $r_3 = +\ 24.23$ | $d_2 = 5.05$ | 1.7170 | 48.1 |
| $L_3$ | $r_4 = +\ 31.89$ | $d_3 = 1.93$ | 1.68902 | 31.2 |
| | $r_5 = +\ 19.95$ | $l_2 = 7.11$ | | |
| $L_4$ | $r_6 = +1,606.0$ | $d_4 = 8.95$ | 1.46495 | 64.5 |
| $L_5$ | $r_7 = -\ 21.11$ | $d_5 = 7.95$ | 1.57253 | 43.8 |
| $L_6$ | $r_8 = +\ 37.81$ | $d_6 = 16.50$ | 1.7170 | 48.1 |
| | $r_9 = -\ 42.40$ | $l_3 = 6.29$ | | |
| $L_7$ | $r_{10} = -\ 25.31$ | $d_7 = 4.86$ | 1.6420 | 58.0 |
| $L_8$ | $r_{11} = -\ 19.78$ | $d_8 = 1.19$ | 1.51269 | 62.9 |
| $L_9$ | $r_{12} = +\ 57.36$ | $d_9 = 11.93$ | 1.46495 | 64.5 |
| | $r_{13} = -\ 79.38$ | | | |

Example 2

[Aperture ratio 1 : 4.33]

| | Radii | Thicknesses and separations | Kinds of glass | |
|---|---|---|---|---|
| | | | $n_D$ | $v$ |
| $L_1$ | $r_1 = +\ 34.05$ | $d_1 = 3.08$ | 1.6905 | 54.9 |
| | $r_2 = +\ 58.39$ | $l_1 = 0.09$ | | |
| $L_2$ | $r_3 = +\ 22.43$ | $d_2 = 5.80$ | 1.6905 | 54.9 |
| $L_3$ | $r_4 = -254.8$ | $d_3 = 0.92$ | 1.7420 | 44.9 |
| | $r_5 = +\ 18.79$ | $l_2 = 6.80$ | | |
| $L_4$ | $r_6 = +219.7$ | $d_4 = 7.90$ | 1.48488 | 64.5 |
| $L_5$ | $r_7 = -\ 23.28$ | $d_5 = 4.40$ | 1.57242 | 43.8 |
| $L_6$ | $r_8 = +\ 42.17$ | $d_6 = 15.50$ | 1.71710 | 48.1 |
| | $r_9 = -\ 41.82$ | $l_3 = 6.41$ | | |
| $L_7$ | $r_{10} = -\ 25.15$ | $d_7 = 4.39$ | 1.6905 | 54.9 |
| $L_8$ | $r_{11} = -\ 19.33$ | $d_8 = 0.88$ | 1.51646 | 64.0 |
| $L_9$ | $r_{12} = +\ 52.63$ | $d_9 = 11.20$ | 1.46617 | 64.8 |
| | $r_{13} = -\ 96.80$ | | | |

Example 3
[Aperture ratio 1: 4.35]

|  | Radii | Thicknesses and separations | Kinds of glass | |
|---|---|---|---|---|
|  |  |  | $n_D$ | $v$ |
| $L_1$ | $r_1 = +\ 35.46$ | $d_1 = 3.06$ | 1.6420 | 58.0 |
|  | $r_2 = +\ 64.78$ | $l_1 = 0.09$ |  |  |
|  | $r_3 = +\ 23.11$ |  |  |  |
| $L_2$ | $r_4 = +\ 30.42$ | $d_2 = 4.82$ | 1.7170 | 48.1 |
|  |  | $l_2 = 0.44$ |  |  |
|  | $r_5 = +\ 31.08$ |  |  |  |
| $L_3$ |  | $d_3 = 1.53$ | 1.68902 | 31.2 |
|  | $r_6 = +\ 19.15$ |  |  |  |
|  |  | $l_3 = 6.78$ |  |  |
|  | $r_7 = +1,532.0$ |  |  |  |
| $L_4$ |  | $d_4 = 8.54$ | 1.46495 | 64.5 |
|  | $r_8 = -\ 20.14$ |  |  |  |
| $L_5$ |  | $d_5 = 3.77$ | 1.57253 | 43.8 |
|  | $r_9 = +\ 36.07$ |  |  |  |
| $L_6$ |  | $d_6 = 15.76$ | 1.7170 | 48.1 |
|  | $r_{10} = -\ 40.87$ |  |  |  |
|  |  | $l_4 = 6.0$ |  |  |
|  | $r_{11} = -\ 24.29$ |  |  |  |
| $L_7$ |  | $d_7 = 4.64$ | 1.6420 | 58.0 |
|  | $r_{12} = -\ 18.87$ |  |  |  |
| $L_8$ |  | $d_8 = 1.14$ | 1.51269 | 62.9 |
|  | $r_{13} = +\ 54.99$ |  |  |  |
| $L_9$ |  | $d_9 = 10.94$ | 1.46495 | 64.5 |
|  | $r_{14} = -\ 79.29$ |  |  |  |

Example 4
[Aperture ratio 1: 4.15]

|  | Radii | Thicknesses and separations | Kinds of glass | |
|---|---|---|---|---|
|  |  |  | $n_D$ | $v$ |
| $L_1$ | $r_1 = +\ 37.04$ | $d_1 = 3.22$ | 1.6503 | 58.7 |
|  | $r_2 = +\ 66.50$ | $l_1 = 0.09$ |  |  |
|  | $r_3 = +\ 24.15$ |  |  |  |
| $L_2$ | $r_4 = +\ 32.20$ | $d_2 = 5.06$ | 1.7170 | 48.1 |
| $L_3$ |  | $d_3 = 1.84$ | 1.6970 | 31.1 |
|  | $r_5 = +\ 20.01$ |  |  |  |
|  |  | $l_2 = 7.13$ |  |  |
|  | $r_6 = +1,242.2$ |  |  |  |
| $L_4$ |  | $d_4 = 8.28$ | 1.46489 | 64.5 |
|  | $r_7 = -\ 21.39$ |  |  |  |
| $L_5$ |  | $d_5 = 4.51$ | 1.56841 | 42.8 |
|  | $r_8 = +\ 40.03$ |  |  |  |
| $L_6$ |  | $d_6 = 11.50$ | 1.7170 | 48.1 |
|  | $r_9 = -\ 27.75$ |  |  |  |
|  |  | $l_3 = 0.23$ |  |  |
|  | $r_{10} = -\ 26.83$ |  |  |  |
| $L_7$ |  | $d_7 = 4.83$ | 1.6711 | 48.0 |
|  | $r_{11} = -\ 43.05$ |  |  |  |
|  |  | $l_4 = 5.80$ |  |  |
|  | $r_{12} = -\ 25.86$ |  |  |  |
| $L_8$ |  | $d_8 = 4.88$ | 1.6503 | 58.7 |
|  | $r_{13} = -\ 20.01$ |  |  |  |
| $L_9$ |  | $d_9 = 1.84$ | 1.51418 | 63.8 |
|  | $r_{14} = +\ 58.32$ |  |  |  |
| $L_{10}$ |  | $d_{10} = 11.96$ | 1.46495 | 64.5 |
|  | $r_{15} = -\ 82.05$ |  |  |  |

Example 5
[Aperture ratio 1: 4.2]

|  | Radii | Thicknesses and separations | Kinds of glass | |
|---|---|---|---|---|
|  |  |  | $n_D$ | $v$ |
| $L_1$ | $r_1 = +\ 36.46$ | $d_1 = 3.17$ | 1.6503 | 58.7 |
|  | $r_2 = +\ 65.48$ | $l_1 = 0.09$ |  |  |
|  | $r_3 = +\ 23.46$ |  |  |  |
| $L_2$ | $r_4 = +\ 19.57$ | $d_2 = 6.79$ | 1.6905 | 54.9 |
|  |  | $l_2 = 7.02$ |  |  |
|  | $r_5 = +996.5$ |  |  |  |
| $L_3$ |  | $d_3 = 8.79$ | 1.43385 | 95.5 |
|  | $r_6 = -\ 20.34$ |  |  |  |
| $L_4$ |  | $d_4 = 3.81$ | 1.54758 | 45.6 |
|  | $r_7 = +\ 39.86$ |  |  |  |
| $L_5$ |  | $d_5 = 15.85$ | 1.70154 | 52.0 |
|  | $r_8 = -\ 40.51$ |  |  |  |
|  |  | $l_3 = 6.39$ |  |  |
|  | $r_9 = -\ 25.05$ |  |  |  |
| $L_6$ |  | $d_6 = 4.80$ | 1.6503 | 58.7 |
|  | $r_{10} = -\ 19.70$ |  |  |  |
| $L_7$ |  | $d_7 = 1.81$ | 1.51418 | 64.0 |
|  | $r_{11} = +\ 58.81$ |  |  |  |
| $L_8$ |  | $d_8 = 11.64$ | 1.46495 | 64.5 |
|  | $r_{12} = -\ 79.72$ |  |  |  |

Example 6
[Aperture ratio 1:4.15]

|  | Radii | Thicknesses and separations | Kinds of glass | |
|---|---|---|---|---|
|  |  |  | $n_D$ | $v$ |
| $L_1$ | $r_1 = +\ 39.15$ | $d_1 = 3.23$ | 1.64182 | 58.2 |
|  | $r_2 = +\ 71.80$ | $l_1 = 0.07$ |  |  |
|  | $r_3 = +\ 23.63$ |  |  |  |
| $L_2$ | $r_4 = +\ 32.91$ | $d_2 = 3.85$ | 1.7171 | 47.7 |
| $L_3$ |  | $d_3 = 2.60$ | 1.68149 | 31.1 |
|  | $r_5 = +\ 20.09$ |  |  |  |
|  |  | $l_2 = 7.08$ |  |  |
|  | $r_6 = +530.0$ |  |  |  |
| $L_4$ |  | $d_4 = 8.82$ | 1.46580 | 64.7 |
|  | $r_7 = -\ 21.59$ |  |  |  |
| $L_5$ |  | $d_5 = 5.20$ | 1.57600 | 41.5 |
|  | $r_8 = +\ 53.97$ |  |  |  |
| $L_6$ |  | $d_6 = 14.55$ | 1.71710 | 47.7 |
|  | $r_9 = -\ 42.68$ |  |  |  |
|  |  | $l_3 = 6.15$ |  |  |
|  | $r_{10} = -\ 25.63$ |  |  |  |
| $L_7$ |  | $d_7 = 5.06$ | 1.6503 | 58.5 |
|  | $r_{11} = -\ 20.33$ |  |  |  |
| $L_8$ |  | $d_8 = 1.49$ | 1.5000 | 64.0 |
|  | $r_{12} = +207.2$ |  |  |  |
|  |  | $l_4 = 1.06$ |  |  |
|  | $r_{13} = +578.2$ |  |  |  |
| $L_9$ |  | $d_9 = 11.7$ | 1.5800 | 61.0 |
|  | $r_{14} = -\ 96.4$ |  |  |  |

I claim:

1. An objective, comprising at least four components in air, the first component and the third component being convergent, the fourth component being divergent, the second component being a meniscus curved toward the object, the air gap between the first component and the second component having the form of a divergent lens with its surface of greater curvature directed toward the second component, the air gap between the second component and the third component having the form of a convergent lens with its surface of greater curvature directed toward the second component, the air gap between the third component and the fourth component having the form of a convergent meniscus bent toward the image with its surface of greater curvature directed toward the fourth component, the third component having at least one cemented surface, the axial thickness of the third component being greater than 0.1f and smaller than 0.5f, wherein f is the total focal length of the objective, the fourth component having means causing a divergence of center rays.

2. An objective, comprising at least four components in air, the first component and the third component being convergent, the fourth component being divergent, the second component being a meniscus curved toward the object, the air gap between the first component and the second component having the form of a divergent lens with its surface of greater curvature directed toward the second component, the air gap between the second component and the third component having the form of a convergent lens with its surface of greater curvature directed toward the second component, the air gap between the third component and the fourth component having the form of a convergent meniscus bent toward the image with its surface of greater curvature directed toward the fourth component, the third component having at least one cemented surface, the axial thickness of the third component being greater than 0.1f and smaller than 0.5f wherein f is the total focal length of the objective, the fourth component having a cemented surface bent toward the object, the refraction before the last-mentioned cemented surface being greater than after it, whereby a divergence of center rays is caused.

3. An objective comprising at least four components in air, the first component and the third component being convergent, the fourth component being divergent, the second component being a meniscus curved toward the object, the air gap between the first component and the second component having the form of a divergent lens with its surface of greater curvature directed toward the second component, the air gap between the second component and the third component having the form of a convergent lens with its surface of greater curvature directed toward the second component, the air gap between the third component and the fourth component having the form of a convergent meniscus bent toward the image with its surface of greater curvature directed toward the fourth component, the third component having at least one cemented surface, the axial thickness of the third component being greater than 0.1f and smaller than 0.5f, wherein f is the total focal length of the objective, the fourth component having an uncemented surface pair forming an air gap constituting a collecting lens, whereby a divergence of center rays is caused.

4. An objective, comprising at least four components in air, the first component and the third component being convergent, the fourth component being divergent, the second component being a meniscus curved toward the object, the air gap between the first component and the second component having the form of a divergent lens with its surface of greater curvature directed toward the second component, the air gap between the second component and the third component having the form of a convergent lens with its surface of greater curvature directed toward the second component, the air gap between the third component and the fourth component having the form of a convergent meniscus bent toward the image with its surface of greater curvature directed toward the fourth component, the third component having at least one cemented surface, the axial thickness of the third component being greater than 0.1f and smaller than 0.5f, wherein f is the total focal length of the objective, the fourth component having a surface pair having the greatest angle of refraction with respect to center rays passing therethrough in comparison to all other refracting surfaces.

LUDWIG BERTELE.

REFERENCES CITED

The following references are of record in the file of this patent:

UNITED STATES PATENTS

| Number | Name | Date |
|---|---|---|
| 560,460 | Addis | May 19, 1896 |
| 1,077,420 | Minor | Nov. 4, 1913 |
| 1,098,823 | Minor | June 2, 1914 |
| 1,945,570 | Rudolph | Feb. 6, 1934 |
| 2,084,309 | Bertele | June 22, 1937 |